United States Patent
Ge et al.

(10) Patent No.: US 9,144,984 B2
(45) Date of Patent: Sep. 29, 2015

(54) COMPOUND SLOT

(75) Inventors: Ning Ge, Singapore (SG); Bee Ling Peh, Singapore (SG); Trudy Benjamin, Portland, OR (US); Ken Kiat Ng, Singapore (SG); Jianhui Gu, Singapore (SG)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 14/376,058

(22) PCT Filed: Apr. 27, 2012

(86) PCT No.: PCT/US2012/035369
§ 371 (c)(1),
(2), (4) Date: Jul. 31, 2014

(87) PCT Pub. No.: WO2013/162591
PCT Pub. Date: Oct. 31, 2013

(65) Prior Publication Data
US 2014/0362146 A1   Dec. 11, 2014

(51) Int. Cl.
*B41J 2/175* (2006.01)
*B41J 2/14* (2006.01)
*B23K 26/38* (2014.01)
*B41J 2/16* (2006.01)

(52) U.S. Cl.
CPC ............ *B41J 2/175* (2013.01); *B23K 26/383* (2013.01); *B41J 2/14145* (2013.01); *B41J 2/14201* (2013.01); *B41J 2/1634* (2013.01); *B41J 2002/14419* (2013.01); *Y10T 29/49401* (2015.01)

(58) Field of Classification Search
CPC ............................ B41J 2/1634; B41J 2/14145
See application file for complete search history.

(56) References Cited

U.S. PATENT DOCUMENTS

| 5,317,346 | A | 5/1994 | Garcia |
| 5,387,314 | A * | 2/1995 | Baughman et al. ............. 216/27 |
| 6,517,198 | B2 | 2/2003 | Yoshihira et al. |
| 6,540,337 | B1 | 4/2003 | Pollard |
| 6,746,106 | B1 | 6/2004 | Hager |
| 7,320,513 | B2 * | 1/2008 | Kim et al. ........................ 347/65 |
| 8,262,204 | B2 * | 9/2012 | Braun et al. .................... 347/85 |
| 2009/0213198 | A1 | 8/2009 | Sassano et al. |
| 2010/0224670 | A1 * | 9/2010 | Buchwalter et al. .......... 228/102 |

FOREIGN PATENT DOCUMENTS

| CN | 1051529 A | 5/1991 |
| CN | 1291547 A | 4/2001 |

OTHER PUBLICATIONS

International Search Report and Written Opinion for Application No. PCT/US2012/035369, Dec. 20, 2012, 9 pages.

* cited by examiner

*Primary Examiner* — Stephen Meier
*Assistant Examiner* — John P Zimmermann
(74) *Attorney, Agent, or Firm* — Brooks, Cameron & Huebsch, PLLC

(57) ABSTRACT

The present disclosure describes a compound slot, and systems and methods of forming the compound slot. An example of a compound slot includes a wafer, where the compound slot includes a trench along a long axis of the compound slot and on a top surface of the wafer, where the trench passes through an initial portion of a total depth of the wafer. A number of openings pass through a remaining portion of the total depth of the wafer, where at least a retained portion of a bottom of the trench is present around a perimeter of each of the number of openings.

15 Claims, 4 Drawing Sheets

COMPOUND SLOT

BACKGROUND

Printing devices are widely used. These printing devices may utilize a printhead that includes a slot to deliver ink in the printing process. Such printing devices can provide multiple desirable characteristics at a reasonable price.

DETAILED DESCRIPTION

Figure 1:
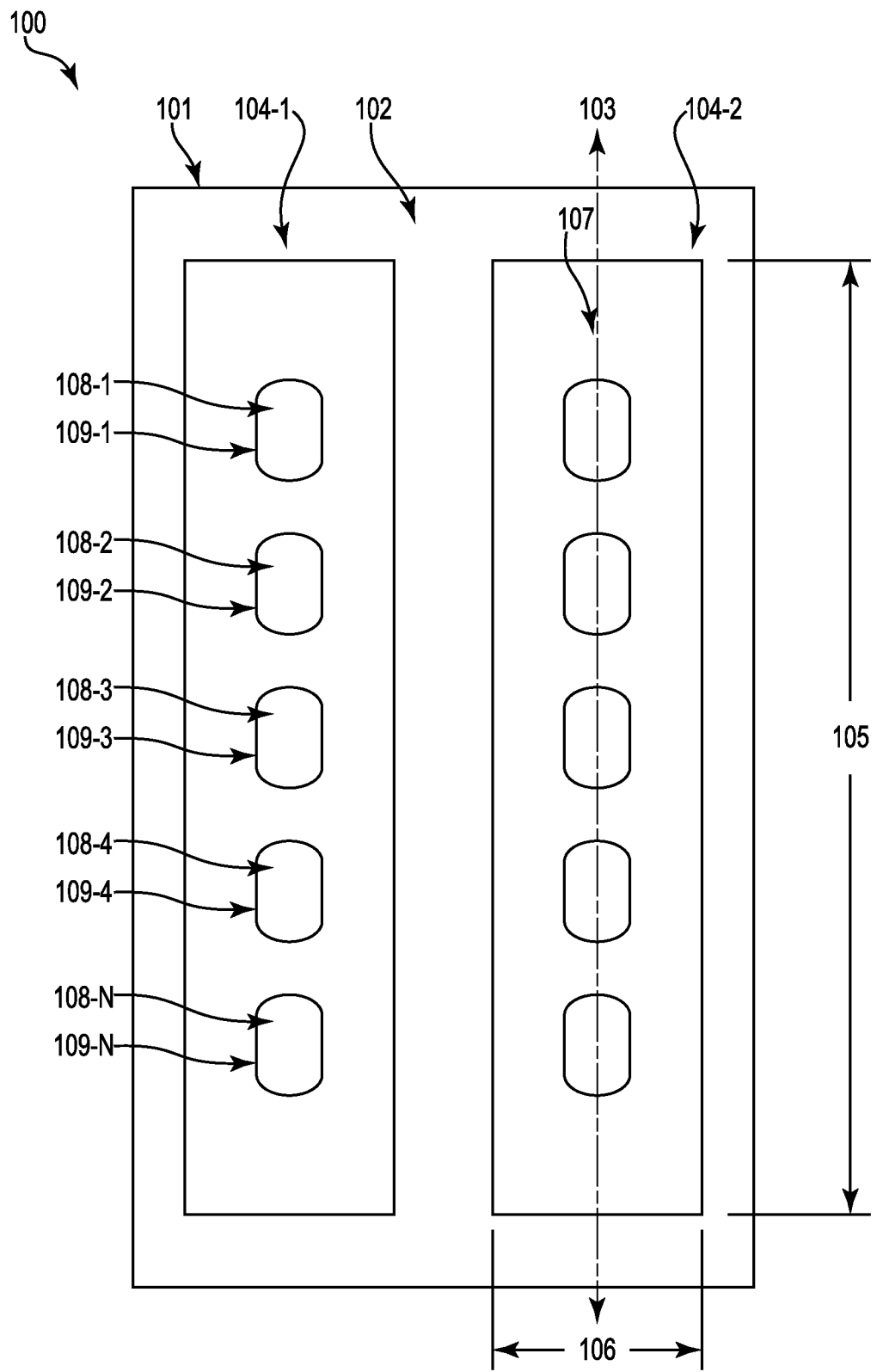
FIG. 1 illustrates an example of a top-view schematic of a portion of a compound slot according to the present disclosure.

Examples of the present disclosure include compound slots, and systems and methods of forming the same. An example of a compound slot includes a wafer, where the compound slot includes a trench along a long axis of the compound slot and on a top surface of the wafer, where the trench passes through an initial portion of a total depth of the wafer. A number of openings pass through a remaining portion of the total depth of the wafer, where at least a retained portion of a bottom of the trench is present around a perimeter of each of the number of openings.

Compound slots, and systems and methods for forming the same, as described herein, can be used in a variety of printing devices. That is, the printing devices can utilize a printhead (e.g., a slot-fed printhead) that includes a compound slot to deliver ink in the printing process. As printing technology improves, the ability to provide improved features and higher resolution becomes increasingly possible. Consumers may want, among other things, higher image resolution, realistic colors, and an increased printing rate (e.g., pages per minute). However, improved features and lower prices continue to press manufactures to advance efficiencies.

As the level of resolution and the rate of printing increases, demand for ink can be increased. This increased demand can lead to an increase in the ink flow rate to the printhead. That is, increased resolution and/or operational speed of the printer can depend upon on an ability to reliably and/or efficiently increase the ink flow rate to the printhead. Increasing a volume (e.g., a volume of a slot) for ink to flow through can effectuate an increased ink flow rate to the printhead. However, the increased volume can lead to a decrease in structural strength of the printhead that can increase susceptibility to cracks being formed in the printhead (e.g., crack die failure). Thus, it is useful to reinforce the printhead (e.g., the slot) with one or more structural members to increase the structural strength of the printhead.

To realize such goals, a compound slot can be utilized. That is, a compound slot can include a plurality of trenches to deliver fluid (e.g., ink) to the print cartridges and/or consequently to a print media via the printhead (e.g., the slot-fed printhead). In addition, the compound slot may include one or more structural members to increase the structural strength of the printhead. However, potential difficulties are that reinforcing the compound slot can cause increases in the cost, effort, and/or time of formation of the compound slot. Additionally, reinforcing members present in the compound slot may lead to the formation of bubbles that reduce printing quality (e.g., resolution), rate, and/or cause unintended termination of printing. Accordingly, forming reinforcing members for structural support and/or in shapes conducive to avoiding formation of bubbles in the compound slot can improve reliable print quality (e.g., resolution) and/or operational speed of printers.

Compound slots used in conjunction with fluid (e.g., ink) delivery, as described herein, can contribute to high resolution and/or operational speed of printing devices. Further, the compound slots can be incorporated directly into a variety of printing devices (e.g., printheads) because the compound slots can, as described herein, be small and/or readily fabricated, among other considerations.

FIG. 1 illustrates an example of a top-view schematic of a portion of a compound slot according to the present disclosure. In the following Detailed Description and Figures, some features are grouped together in a single example for the purpose of streamlining this disclosure. This manner of presentation is not to be interpreted as reflecting an intention that the disclosed examples require more features (e.g., elements and/or limitations) than are expressly recited in the claims of the present disclosure. Rather, as the following claims reflect, inventive subject matter may require less than all features of a single disclosed example. Hence, the following claims are hereby incorporated into the Detailed Description, with each claim standing on its own merit as a separate example.

As illustrated in FIG. 1, the example of the portion of the compound slot 100 includes a wafer 101 that includes, for example, a plurality of trenches 104-1, 104-2 (e.g., defined in part by a length 105 and a width 106) along a long axis 103 of a compound slot 100 and on a top surface 102 of the wafer 101, where the trenches 104-1, 104-2 pass through an initial portion of a total depth of the wafer 101, as described herein. In various examples, the compound slot 100 can include a number of openings 108-1 through 108-N through a remaining portion of the total depth of the wafer, as described herein. In addition, in various examples, the compound slot 100 can include a retained portion of a bottom 107, as described herein, of the trenches 104-1, 104-2 present around a perimeter 109-1 through 109-N of each of the number of openings 108-1 through 108-N. As defined herein, the number of trenches 104-1, 104-2 in the compound slot 100 can be one or more and the number of openings in the bottom of each trench can be two or more.

In the detailed description of the present disclosure, reference is made to the accompanying drawings that form a part hereof and in that is shown, by way of illustration, examples of how the disclosure may be practiced. These examples are described in sufficient detail to enable those of ordinary skill in the art to practice the examples of this disclosure. It is to be understood that other examples may be utilized and that material variations and/or structural changes may be made without departing from the scope of the present disclosure. Further, where appropriate, as used herein, "for example" and "by way of example" should each be understood as an abbreviation for "by way of example and not by way of limitation".

The figures herein follow a numbering convention in that the first digit or digits correspond to the drawing figure number and the remaining digits identify an element or component in the drawing. Similar elements or components between different figures may be identified by the use of similar digits. For example, 104 may reference element "104" in FIG. 1, and a similar element may be referenced as "204" in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense.

Unless otherwise indicated, all numbers expressing ranges and dimensions, and so forth, used in the specification and claims are to be understood as being modified in all instances by the terms "substantially" or "about". Accordingly, unless indicated to the contrary, the numerical parameters set forth in the following specification and attached claims are approximations that may vary depending upon the properties sought.

As described herein, the number of openings 108-1 through 108-N can vary in shape, size, orientation, and/or a total number of openings per compound slot. As illustrated in FIG. 1, the number of openings 108-1 through 108-N can be five openings that are substantially equidistant from one another. However, the present disclosure is not limited to such a configuration. That is, various configurations of the number of openings 108-1 through 108-N, the perimeter 109-1 through 109-N of each of the number of openings, the bottom 107 of the trench 104, and the retained portion thereof, and/or the remaining portion of the total depth are possible. These configurations can, in various examples, be conducive to providing structural support for the number of trenches 104-1, 104-1 and/or the compound slot 100. In some examples, trenches 104-1, 104-1 and/or the compound slot 100 can be configured to reduce bubble formulation, as described herein.

As illustrated in FIG. 1, in some examples, the number of openings 108-1 through 108-N can include substantially circular and/or elliptical openings. Additional shapes such as square, rectangular, triangular, rhomboidal, and/or trapezoidal, among others, can be used for one or more of the number of openings 108-1 through 108-N. In some examples, shape and/or angle of the walls of the number of openings, among other structural features, can be varied in a manner conducive to providing structural support for the compound slot 100 and/or reducing formation of bubbles in the trench 104, among other considerations. That is, in various examples, the shape, size, and/or orientation of the number of openings 108-1 through 108-N can reduce bubble formation, provide structural support, and/or can be conducive to retaining the remaining portion of the bottom 107 of the trench 104, as described herein.

The trench 104 can be defined, at least in part, by the length 105 and/or the width 106, as illustrated in FIG. 1. In some examples, the trench can be substantially rectangular, as illustrated in FIG. 1. However, the present disclosure is not limited to such a configuration. That is, the shape of the trench 104 and/or angle of the trench walls, among other structural features, can be varied in a manner conducive to providing structural support for the compound slot 100 and/or reducing formation of bubbles in the trench 104, among other considerations.

In some examples, the trench can pass through the wafer in a range of from substantially 50% to substantially 90% of the total depth of the wafer, as detailed herein in reference to FIG. 2. In some examples, the remaining portion of the total depth of the wafer can have a thickness in a range of from substantially 10% to substantially 50% of the total depth of the wafer, as detailed herein in reference to FIG. 2.

In some examples, the compound slot can include a polymer (e.g., IJ5000 and/or SU-8) on a surface of the trench, the number of openings, and/or a top surface of the wafer, as described herein. In some examples, the compound slot 100 can include a plurality of trenches 104-1, 104-2 on the top surface 102 of the wafer 101, as described herein.

Figure 2A:
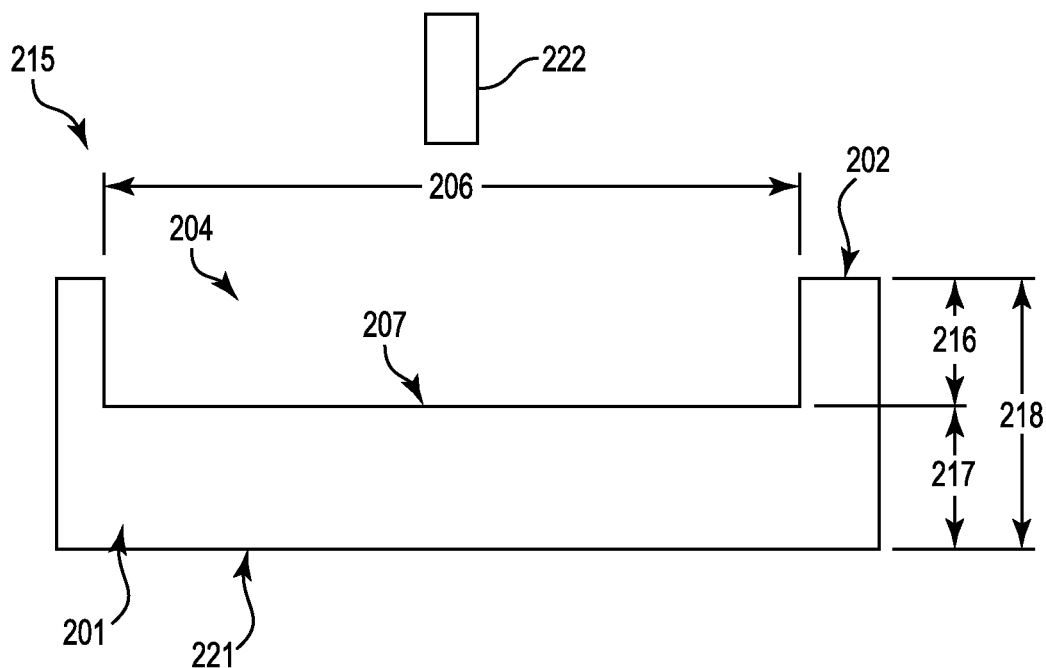
FIGS. 2A-2B illustrate an example of a side-view schematic of a portion of a compound slot formed according to the present disclosure.
Figure 2B:
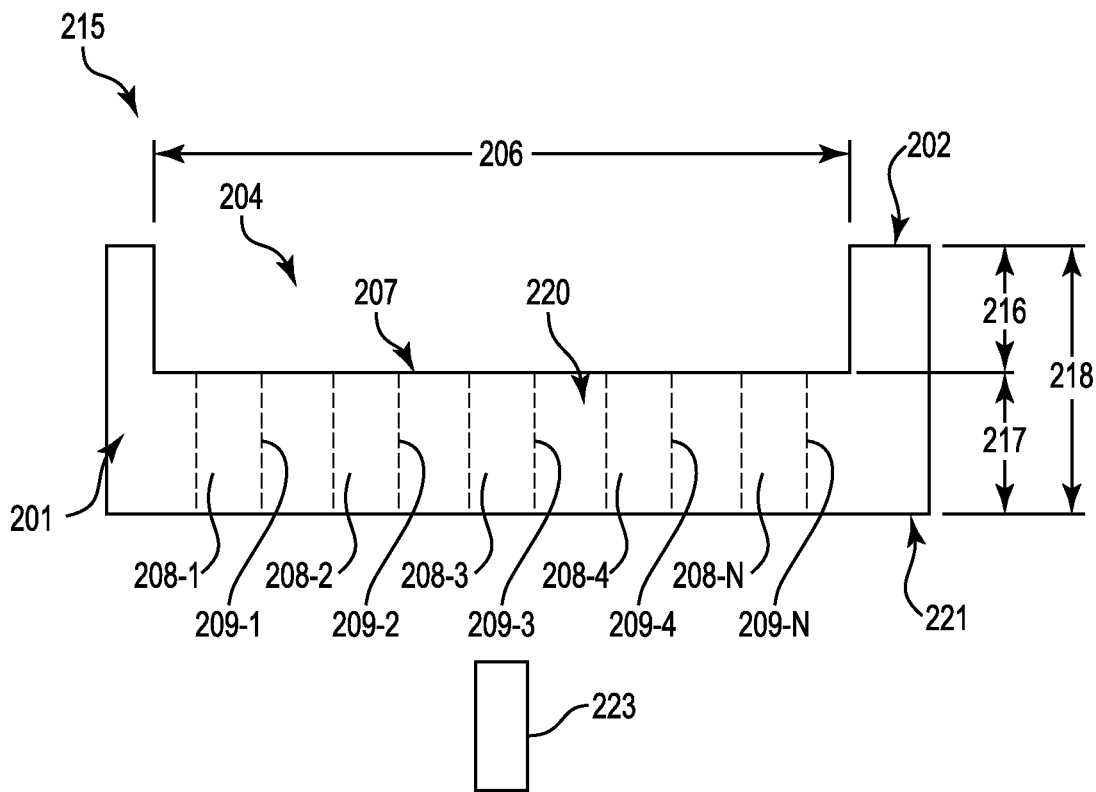

FIGS. 2A-2B illustrate an example of a side-view schematic of a portion of a compound slot formed according to the present disclosure. FIG. 2A illustrates an example of a side-view schematic of a trench 204 of a compound slot 215 formed according to the present disclosure. As illustrated in FIG. 2A, in various examples, forming the compound slot 215 can include forming the compound slot 215 in a wafer 201. Forming the compound slot 215 includes forming the trench 204 along a long axis (e.g., 103 as illustrated in FIG. 1) of the compound slot 215 and on a top surface 202 of the wafer 201, where the trench 204 passes through an initial portion 216 of a total depth 218 of the wafer 201.

FIG. 2B illustrates an example of a side-view schematic of a number of openings in a compound slot formed according to the present disclosure. As illustrated in FIG. 2B, in various examples, forming the compound slot 215 can include providing structural support for the compound slot 215 by forming the number of openings 208-1 through 208-N through a remaining portion 217 of the total depth 218 of the wafer 201, wherein forming the number of openings 208-1 through 208-N includes retaining at least a portion 220 of a bottom 207 of the trench 204 around an entirety of a perimeter 209-1 through 209-N of each of the number of openings 208-1 through 208-N.

As described herein, the wafer 201 can be formed from a material selected from the group that includes of a single crystalline silicon, polycrystalline silicon, gallium arsenide, ceramics, any suitable semi-conducting material, and/or combinations thereof. The material and/or a total thickness of the material can be chosen to achieve adequate structural support for the formation of the trench 204. The wafer 201 can include, in various examples, the initial portion 216 and a remaining portion 217 of the total depth 218 of the wafer forming the total depth 218 (e.g., total thickness) of the wafer 201. In some examples, the total thickness of the wafer 201 can be in a range of from substantially 50 microns to substantially 2000 microns (e.g., 650 microns).

In some examples, the remaining portion 217 of the total depth 218 of the wafer 201 can be in a range of from substantially 50% to substantially 10% of the total depth 218 of the wafer 201. Accordingly, in this configuration the initial portion 216 can be in a range of from substantially 50% to substantially 90% of the total depth 218 of the wafer 201. In some examples, the retained portion 220 of the bottom 207 of the trench 204 can be in a range of from substantially 20% to substantially 80% of an area of the bottom 207 of the trench 204.

As described herein, the area of the bottom 207 of the trench 204 can be defined, in part, by a length (e.g., 105 as illustrated in FIG. 1) and/or a width 206. Additionally, the area of the bottom 207 of the trench 204 can be defined, in part, by the remaining portion 217 of the total depth of the wafer 201. That is, the area of the bottom 207 of the trench 204 can be defined by the length 105, the width 106, and the retained portion 220 of the trench 104, as illustrated by FIGS. 1 and 2B, respectively. Accordingly, the compound slot 215 can be scalable to form a compound slot 215 of any practical length 105 and/or width 106.

As described herein, the compound slot 215 can be formed utilizing any suitable technique. For example, the compound slot 215 can be formed using techniques such as sand drilling, mechanical drilling, etching, laser, an air aided laser, a water aided laser, and/or combination thereof. In some examples, forming the trench 204 can include forming the trench with a laser, as described herein. In addition, in some examples, forming the number of openings 208-1 through 208-N can include forming the number of openings with a laser, as described herein.

As described herein, a laser can be either a pulse or continuous laser. Pulsed operation of a laser (e.g., a pulse laser) refers to any laser not classified as continuous wave (e.g., a continuous laser), so that the photons can be applied in pulses of a defined duration at a defined repetition rate. Alternatively, continuous lasers can utilize a beam whose output can be constant over time. In some examples, the laser can control the shape, orientation, surface roughness (e.g., by removing sharp edges and/or rough material from the top surface of the wafer, from the perimeter 109, 209, and/or from the walls of the number of openings 108, 208), and/or size of the trench 104, 204 and/or the number of openings 108, 208 in a manner conducive to reducing crack initiation and/or bubble formation sites. Operating in pulsed and/or continuous mode can satisfy applications as described herein.

Alternatively or in addition, in some examples, the lasers can be multi-mode (e.g., having multiple outputs based on a variety of selectable output parameters). As used herein, utilizing a multi-mode laser can account for various factors (e.g., the size and/or shape of the trench 104, 204 the particular material and/or configuration of the wafer 101, 201 among other considerations). Based on such considerations, the laser can be adjusted to emit a wavelength of a particular frequency and/or diameter.

In various examples, the laser can have a laser beam with a diameter in a range of from substantially 5 microns to substantially 100 microns. The laser can apply the laser beam to the wafer 101, 201 one or a plurality of times. That is, for example, the laser beam can make multiple passes over a first portion of the wafer 101, 201 and/or a single pass over a second portion of the wafer 101, 201. A speed the laser beam can move over the wafer 101, 201 and/or a focus of the beam also can be varied to achieve different results depending on the application. In some examples, the laser can have a debris extraction system (e.g., the water-aided laser) that can remove debris resulting from laser machining.

As described herein, sand drilling is a mechanical cutting process that can include removing a portion of a material by impacting the material with a plurality of particles (e.g., aluminum oxide, among others) delivered from a high-pressure airflow system. Sand drilling can be referred to as sand blasting, abrasive sand machining, and/or sand abrasion. As described herein, mechanical drilling is a mechanical process that can use various saws and/or drills, among others, for removing a portion of the wafer 101, 201 material.

As described herein, etching is a chemical process for removal of one or a plurality of portions (e.g., unprotected portions) of a surface using a suitable etchant (e.g., tetramethylammonium hydroxide (TMAH), among others). In some examples, the top surface 102, 202 of the wafer can be exposed to an etchant sufficient to remove at least a portion of the wafer 101, 201 material to form a trench 104, 204. In some examples, etching can control the shape, orientation, surface roughness, and/or size of the trench 104, 204 and/or from the number of openings 108, 208. In addition, in some examples, the etchant can remove sharp edges and/or rough material from the top surface of the wafer, from the perimeter 109, 209, and/or the walls of the number of openings 108, 208. This can be conducive to reducing crack initiation and/or bubble formation sites.

In some examples, a polymer can be applied (e.g., coated) on one or more portions of a surface (e.g., the top surface 102 of the wafer 101) of interest that can substantially inhibit etching of the portion of the surface of interest coated with the polymer, such as those described herein. That is, in some examples, the compound slot can include a polymer (e.g., IJ5000 and/or SU-8) on a surface of the trench 204, the number of openings 208-1 through 208-N, and/or the top surface 202 of the wafer 201. The polymer can, in some examples, be a photoimageable polymer, for example, IJ5000 series Barrier material (e.g., tradename IJ5000), and/or a photoresist polymer (e.g., tradename SU-8), among others, suitable to substantially inhibiting etching of the wafer 201, as described herein. Alternatively or in addition, an orifice plate can be placed over various surfaces (e.g., the top surface 202 of the wafer 201). In some examples, the orifice plate includes a nickel substrate. In various examples, the orifice plate and polymer can be integral.

Figure 3:
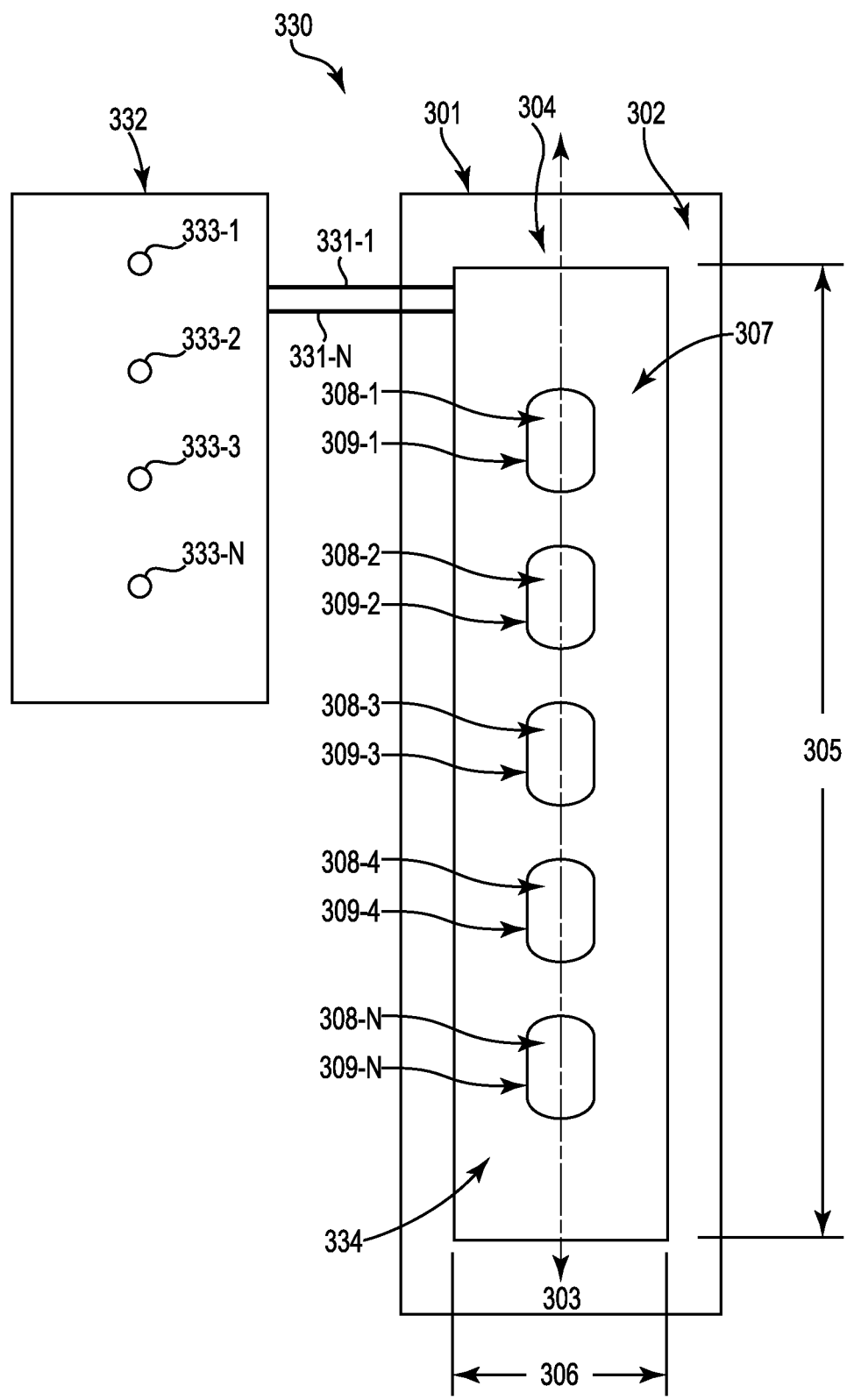
FIG. 3 illustrates an example of a top-view schematic of a portion of a system including a compound slot according to the present disclosure.

FIG. 3 illustrates an example of a top-view schematic of a portion of a system including a compound slot according to the present disclosure. As shown in FIG. 3, the system including the compound slot 330 can enable a fluid 334 (e.g., ink) to be supplied from a fluid supply or reservoir (not shown) to a trench 304. A number of channels (e.g., 331-1 through 331-N) can supply the fluid 334 to a fluid ejecting device 332 having a number of fluid ejecting elements (e.g., 333-1 through 333-N). In various examples, the fluid ejecting device 332 can be a portion of a device to selectively apply the fluid 334 to a medium (e.g., paper, plastic, fabric, among others, in accordance with print data corresponding to a print job). In various examples, a wafer 301 can include the trench 304 (e.g., as defined in part by a length 305 and a width 306) along the entire length (e.g., 305) of the compound slot 330 located on a top surface 302 of the wafer 301, where the trench 304 passes through an initial portion of a total depth of the wafer 301, as described herein.

As shown in FIG. 3, the fluid ejecting device 332, the number of channels 331-1 through 331-N, and/or the compound slot 330 are shown by way of example and not by way of limitation. That is, the size, shape, number, and/or configuration of the fluid ejecting device 332, the number of channels 331-1 through 331-N, and/or the compound slot 330, among others, can be varied in a manner conducive to high resolution and/or operational speed of printing devices utilizing the fluid ejecting device, the number of channels, and/or the compound slot, among other considerations.

In various examples, the compound slot 330, as shown in FIG. 3, can include a number of openings 308-1 through 308-N through a remaining portion of the total depth of the wafer 301, where at least a retained portion of a bottom 307 of the trench 304 remains around an entirety of a perimeter 309-1 through 309-N of each of the number of openings 308-1 through 308-N, as described herein. In some examples, a fluid 334 can be retained in the trench 304. In various examples, the fluid ejection device 332 can be coupled to the trench 304 (e.g., to receive the fluid 334) through channels 331-1 through 331-N.

In some examples, the compound slot (e.g., 215, 330) can include at least three of the openings, as described herein, in each trench. In some examples, the number of openings (e.g., 208, 308) can include substantially circular and/or elliptical openings, as described herein. In some examples, the retained portion (e.g., 220) of the bottom (e.g., 207, 307) of the trench (e.g., 204, 304) is in a range of from substantially 20% to substantially 80% of an area of the bottom of the trench, as described herein.

In some examples, the fluid ejecting elements 333-1 through 333-N can include heat-activated (e.g., via thin film resistors) and/or pressure-activated elements. In some examples, the fluid ejecting device 332 can be and/or can included in a printhead. In some examples the fluid ejecting device 332 and/or a printing device including the fluid ejecting device 332 can include a processor (not shown), as described herein.

One or more fluid sources (e.g., an ink supply or reservoir) can provide fluid to the compound slot 330, fluid ejecting device 332, and/or consequently to a medium via the fluid ejecting elements 333-1 through 333-N. In various examples, self-contained fluid sources can be refilled with fluid (e.g., ink). Alternatively and/or in addition, the compound slot can be fluidically coupled (e.g., via a flexible conduit) to one or more fixed or removable fluid containers acting as the fluid (e.g., ink) source.

The small size of the compound slot makes wafers including multiple trenches practical. As such, in some examples, the compound slot can include the plurality of trenches on the top surface of the wafer. In some examples, the plurality of the trenches can be coupled to a single fluid supply, as described herein. Alternatively, the plurality of trenches can divide the fluid supply so that each of the plurality of trenches receives a separate fluid supply. As FIG. 1 illustrates, in some examples, the plurality of trenches can be two trenches. However, the present disclosure is not limited to such a configuration.

In some examples, the small size of the compound slot can be conducive to having microelectronics (e.g., formed from a semiconductor) incorporated within, deposited over, and/or supported by the compound slot. In various examples, the semiconductor can be positioned on a bottom surface 221 of the wafer 101 located opposite the top surface 102 of the wafer 101.

Hence, an example of a system for forming a compound slot, as described herein, can include a wafer (e.g., 201, 301), a laser 222 that forms a trench (e.g., 204, 304) along the entire length (e.g., 305) of the compound slot (e.g., 215, 330) located on a top surface (e.g., 302) of the wafer (e.g., 201, 301), where the trench passes through an initial portion (e.g., 216) of a total depth (e.g., 218) of the wafer (e.g., 201, 301). In various examples, the system for forming the compound slot (e.g., 215, 330) can include a laser 223 (e.g., which can, in various examples, be the same as or different from laser 222) that forms a number of openings (e.g., 208, 308) through a remaining portion (e.g., 217) of the total depth (e.g., 218) of the wafer (e.g., 201, 301). In various examples, at least a retained portion (e.g., 220) of a bottom (e.g., 207, 307) of the trench (e.g., 204, 304) remains around an entirety of a perimeter (e.g., 209, 309) of each of the number of openings (e.g., 208, 308).

Figure 4:
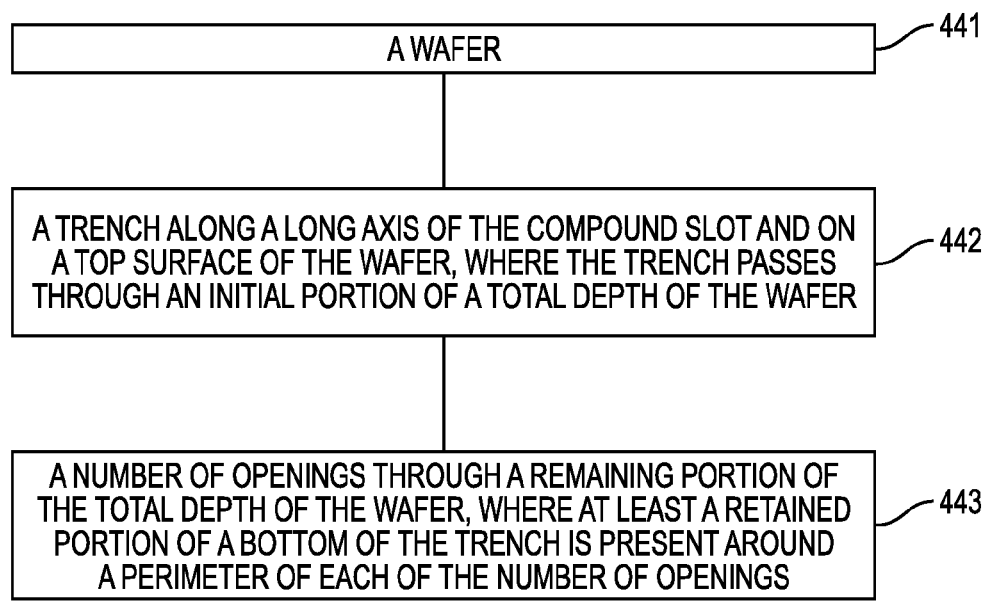
FIG. 4 is a block diagram illustrating an example of a portion of a compound slot formed according to the present disclosure.

FIG. 4 is a block diagram illustrating an example of a portion of a compound slot formed according to the present disclosure. In accordance with the compound slot described herein, there is a wafer, as shown in block 441. As shown in block 442, the compound slot includes a trench along a long axis of the compound slot and on a top surface of the wafer, where the trench passes through an initial portion of a total depth of the wafer. As shown in block 443, the compound slot includes a number of openings through a remaining portion of the total depth of the wafer, where at least a retained portion of a bottom of the trench is present around a perimeter of each of the number of openings. The structural integrity of the compound slot can be increased by retaining at least a portion of a bottom of the trench around an entirety of a perimeter of each of the number of openings, as described herein.

In some examples, the compound slot (e.g., 100) can include a plurality of trenches (e.g., 104-1, 104-2) on the top surface (e.g., 102) of the wafer (e.g., 101), as described herein. In some examples, the compound slot (e.g., 100) can include a number of openings (e.g., 108-1 through 108-N) that are substantially circular and/or elliptical openings, as illustrated in FIG. 1. In some examples, the compound slot (e.g., 215) can include the retained portion (e.g., 220) of the bottom (e.g., 207) of the trench (e.g., 204) being in a range of from substantially 20% to substantially 80% of an area of the bottom (e.g., 207) of the trench (e.g., 204), as illustrated in FIG. 2. In addition, in some examples, the compound slot (e.g., 215) can include a remaining portion (e.g., 217) of the total depth (e.g., 218) of the wafer (e.g., 201) that has a thickness in the range of from substantially 10% to substantially 50% of the total depth (e.g., 218) of the wafer (e.g., 201), as illustrated in FIG. 2. In some examples, the compound slot (e.g., 215) can include a polymer on a surface of the trench (e.g., 204), the number of openings (e.g., 208-1 through 208-N), and/or a top surface (e.g., 202) of the wafer (e.g., 201).

As described herein, the compound slot can be used in conjunction with a printing device that can utilize the compound slot. In some examples, the printing device can be an inkjet printer. In various examples, the printer can be capable of printing in black-and-white and/or in black-and-white as well as color. The term "printing device" refers to any type of printing device and/or image forming device that can employ compound slots to achieve at least a portion of its functionality. Examples of such printing devices can include, but are not limited to, printers, facsimile machines, and/or photocopiers.

The printing device can include one or more processors. The processors can control various printer operations, such as media handling and/or carriage movement for linear positioning of the fluid ejecting device (e.g., 332) over a print media (e.g., paper, transparency, etc.). In some examples, the processors can communicate with other electronic and/or computing devices. The printing device can, in some examples, have an electrically erasable programmable read-only memory (EPROM), read-only memory (ROM), and/or a random access memory (RAM). The memory components (e.g., EPROM, ROM, and/or RAM), can store various information and/or data such as configuration information, fonts, templates, data being printed, and/or menu structure information. In some examples, a printing device can also include a flash memory device in place of or in addition to the memory components (e.g., EPROM). In some examples, a system bus can connect the various components (e.g., EPROM) within the printing device.

Alternatively or in addition, the printing device can, in some examples, have a firmware component that is implemented as a permanent memory module stored in memory (e.g., ROM). The firmware can be programmed and/or tested like software. In some examples, the firmware can be distributed along with the printing device to implement and/or coordinate operations of the hardware within printing device and/or contain programming constructs used to perform such operations.

The present disclosure includes apparatuses, methods, and systems for implementing a compound slot. Compound slots can be used for the applications described in the present disclosure, although the compound slots are not limited to such applications. It is to be understood that the above description has been made in an illustrative fashion and not a restrictive one. Although specific examples for apparatuses, systems, and methods have been illustrated and described herein, other equivalent component arrangements and/or structures conducive to structural support of the compound slot and/or efficient printing can be substituted for the specific examples shown herein without departing from the spirit of the present disclosure.

What is claimed:

1. A compound slot, comprising:
a wafer, wherein the compound slot comprises:
- a trench along a long axis of the compound slot and on a top surface of the wafer, wherein the trench passes through an initial portion of a total depth of the wafer and has a constant width across the compound slot; and
- a number of openings that pass through a remaining portion of the total depth of the wafer, wherein at least a retained portion of a bottom of the trench is present around a perimeter of each of the number of openings.

2. The compound slot of claim 1, wherein the compound slot comprises a plurality of trenches on the top surface of the wafer.

3. The compound slot of claim 1, wherein the number of openings comprises circular and elliptical openings.

4. The compound slot of claim 1, wherein the retained portion of the bottom of the trench is in a range of from 20% to 80% of an area of the bottom of the trench.

5. The compound slot of claim 1, wherein the trench has a constant width.

6. The compound slot of claim 1, wherein the remaining portion of the total depth of the wafer has a thickness in a range of from 10% to 50% of the total depth of the wafer.

7. A method of forming a compound slot, comprising:
forming the compound slot in a wafer; wherein forming the compound slot comprises:
- forming a trench along a long axis of the compound slot and on a top surface of the wafer, wherein the trench has a constant width across the compound slot and passes through an initial portion of a total depth of the wafer; and
- providing structural support for the compound slot by forming a number of openings through a remaining portion of the total depth of the wafer, wherein forming the number of openings includes retaining at least a portion of a bottom of the trench around an entirety of a perimeter of each of the number of openings.

8. The method of claim 7, wherein forming the trench comprises forming the trench with a laser.

9. The method of claim 7, wherein forming the number of openings comprises forming the number of openings with a laser.

10. The method of claim 7, wherein forming the compound slot comprises applying a polymer on a surface of the trench, the number of openings, and a top surface of the wafer.

11. The method of claim 7, wherein retaining the at least the portion of the bottom of the trench comprises retaining a range of from 20% to 80% of the bottom of the trench.

12. A system comprising a compound slot, comprising:
a wafer;
a trench along an entire length of the compound slot located on a top surface of the wafer, wherein the trench has a constant width across the compound slot, and wherein the trench passes through an initial portion of a total depth of the wafer;
a number of openings through a remaining portion of the total depth of the wafer, wherein at least a retained portion of a bottom of the trench remains around an entirety of a perimeter of each of the number of openings; and
a fluid ejection device coupled to the trench.

13. The system of claim 12, wherein the trench comprises at least three of the openings.

14. The system of claim 12, wherein the trench is rectangular.

15. The system of claim 12, wherein the retained portion of the bottom of the trench is in a range of from 20% to 80% of an area of the bottom of the trench.

* * * * *